Dec. 12, 1967     E. P. HOOD     3,357,086
FISHHOOK THREADER
Filed June 10, 1966
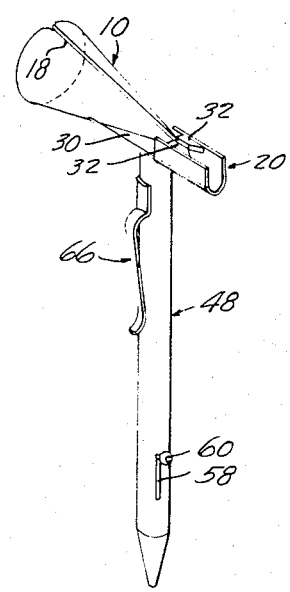
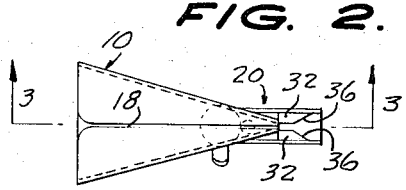
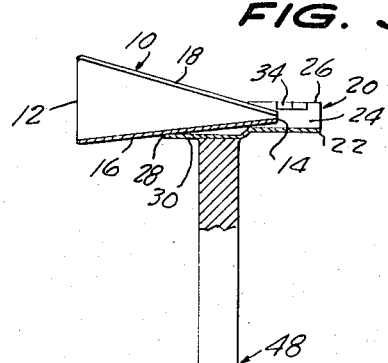
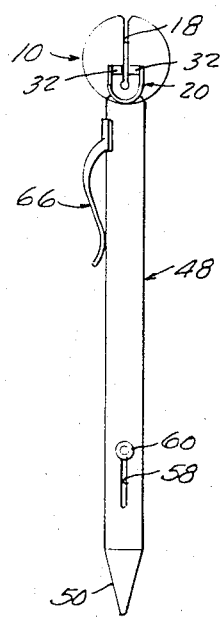
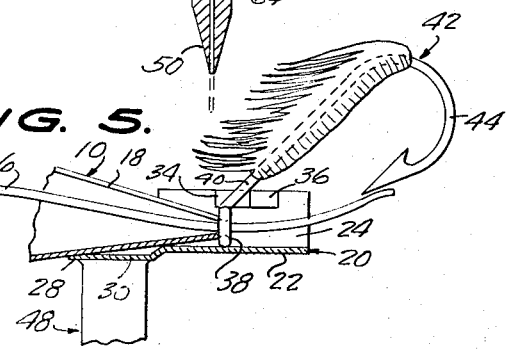
INVENTOR.
EDWARD P. HOOD,
BY
Berman, Davidson & Berman
ATTORNEYS.

United States Patent Office 3,357,086
Patented Dec. 12, 1967

3,357,086
FISHHOOK THREADER
Edward Paul Hood, 3 Court Square,
Rutland, Vt. 05701
Filed June 10, 1966, Ser. No. 556,719
9 Claims. (Cl. 29—241)

This invention relates to a fishhook threader.

The primary object of the invention is the provision of an efficient, practical, and more easily used device of the kind indicated, which embodies positive means for guiding the insertion of a leader through the eye of a fishhook, and means for positively and releasably holding a fishhook eye in line with the leader being inserted, the holding means providing for quick and easy insertion of and removal of the fishhook eye.

Another object of the invention is the provision of a simple and inexpensive device of the character indicated above, which is composed of a small number of uncomplex parts, and which lends itself to being efficiently manufactured at low cost.

In the drawings:

FIGURE 1 is a perspective view of a device of the invention;

FIGURE 2 is a top plan view of FIGURE 1;

FIGURE 3 is a vertical section, taken on the line 3—3 of FIGURE 2, partly broken away and in section;

FIGURE 4 is an end elevation, taken from the right of FIGURE 1; and,

FIGURE 5 is an enlarged fragmentary view, like FIGURE 3, showing insertion in the device of the eye of a fishhook and of a leader passed through the eye.

Referring in detail to the drawings, the illustrated device comprises a funnel 10, having squared outer and inner ends 12 and 14, respectively, the larger outer end 12 being several times larger in diameter than the inner end 14. The funnel 10 has a straight side wall 16, which is imperforate, except for a narrow longitudinal slot 18, formed in the top thereof, and opening to its ends. The slot 18 need not be substantially wider than the gauge of the heaviest leaders intended to be accommodated.

The inner end 14, of the funnel 10, is engaged in the inner end of a longitudinally elongated U-shaped trough 20, having an arcuate bottom wall 22 and parallel spaced, unstanding side walls 24. At a point spaced outwardly from the inner end 14, of the funnel, the funnel side wall 16 engages the inner surfaces of the trough side walls 24, with the axis of the funnel spaced from the trough bottom wall and from the upper edges 26 of the side walls of the trough. The funnel 10 is supported fixedly in this relationship to the trough 20, by being suitably fixed, as indicated at 28, at the bottom of its side wall 16, to a longitudinal extension 30 of the trough bottom wall 22, the extension 30 being downwardly offset relative to the trough bottom wall.

A pair of similar but reversed and opposed resilient detent blocks 32, of suitable resilient and defodmable material, such as rubber and rubber-like plastics, are suitably secured to the inner surfaces of the trough side walls 24, flush with their upper edges 26. The blocks 32 have straight, parallel spaced inner edges 34, and outwardly flared outer edges 36. As shown in FIGURE 5, the blocks 32 are spaced upwardly from the trough bottom wall 22, at a sufficient distance to accommodate, between the blocks and the bottom wall, the eye 38, on the shank 40, of a fishhook 42. The spacing of the inner edges 34, of the blocks 32, is such as to accommodate the shank of the largest size fishhook to be accomodated, and this space is aligned with the slot 18, of the funnel 10.

In use and operation, a fishhook 42, with its crook 44 in upside down position, is held in one hand while the device is held in the other hand, and the eye 38 of the fishhook, accompanied by its shank 40, is forced inwardly between and under the detent blocks 32, so that the eye is aligned with the small inner end 14 of the funnel 10, and the shank 40 is gripped between the edges 34 of the blocks, the eye being preferably engaged with the inner end of the funnel. A leader 46 is then inserted through the larger outer end 12 of the funnel 10, so that its free end then automatically threads the fishhook eye 38. The leader 46 and the fishhook are then together pulled upwardly, so that the leader rises through the funnel slot and the fishhook is freed from the detent blocks, whereupon the leader can be tied to the fishhook.

For convenience in handling the device and in supporting the same on a suitable support, a handle rod 48, made of buoyant material, is provided, which, at one end, is suitably fixed to the underside of the extension 30, at right angles thereto. The rod 48 has a pointed free end 50. The rod 48 is also equipped with a spring-retracted slide-out pin 52, working in an axial blind bore 54, opening to the free end of the rod. The pin 52 has a lateral arm 56, on its upper end, which extends through a vertical slot 58, opening to the bore 54, and has a knob 60, on its outer end. As shown in FIGURE 3, a coil spring 62 surrounds the pin and is compressed between the arms 56, and the lower end 64 of the bore 54, and normally serves to retract the pin into the rod 48. A pocket clip 66 may be affixed to the rod 48. The purpose of the retractable pin 52 is the convenient and easy removal of any foreign matter, such as glue, silicone, and the like, from the eyes of fishhooks, which are frequently found present on new hooks and flies.

What is claimed is:

1. A fishhook threader comprising a funnel having a larger end and a smaller end, a trough having an inner end receiving the smaller end of the funnel, means fixing the funnel relative to the trough, said trough having side walls, opposed resilient and deformable detent blocks affixed to the inner surfaces of the trough side walls, said blocks being spaced from each other crosswise of the trough.

2. A fishhook threader according to claim 1, wherein the top of the side wall of the funnel is formed with a longitudinal slot opening to the ends of the funnel, the space between the detent blocks being aligned with said slot.

3. A fishhook threader according to claim 1, wherein the top of the side wall of the funnel is formed with a longitudinal slot opening to the ends of the funnel, the space between the detent blocks being aligned with said slot, said trough having a bottom spaced downwardly from the detent blocks and spaced downwardly from the smaller end of the funnel.

4. A fishhook threader according to claim 1, wherein the top of the side wall of the funnel is formed with a longitudinal slot opening to the ends of the funnel, the space between the detent blocks being aligned with said slot, said blocks having parallel spaced inner edges, and outwardly flaring outer edges.

5. A fishhook threader according to claim 1, wherein said trough has a bottom wall spaced below the smaller end of the funnel, said bottom wall having a longitudinal extension underlying the funnel and fixed to the side wall of the funnel.

6. A fishhook threader according to claim 1, wherein said trough has a bottom wall spaced below the smaller end of the funnel, said bottom wall having a longitudinal extension underlying the funnel and fixed to the side wall of the funnel, a handle rod fixed at one end to said extension.

7. A fishhook threader according to claim 1, wherein said trough has a bottom wall spaced below the smaller end of the funnel, said bottom wall having a longitudinal extension underlying the funnel and fixed to the side wall of the funnel, a buoyant handle rod fixed at one end to said extension, the rod having a point on its other end.

8. A fishhook threader according to claim 1, wherein said trough has a bottom wall spaced below the smaller end of the funnel, said bottom wall having a longitudinal extension underlying the funnel and fixed to the side wall of the funnel, a handle rod fixed at one end to said extension, and a pocket clip secured on a side of the handle rod.

9. A fishhook threader according to claim 1, wherein said trough has a bottom wall spaced below the smaller end of the funnel, said bottom wall having a longitudinal extension underlying the funnel and fixed to the side wall of the funnel, a handle rod fixed at one end to said extension, the rod having a point on its other end, said rod being formed with an axial blind bore opening through said point, a pin sliding in said bore, said pin having a lateral arm on its upper end, the rod being formed with a slot opening to said bore, through which said arm works, and spring means confined in the rod and compressed between said arm and a part of the bore.

References Cited

UNITED STATES PATENTS

| 138,445 | 4/1873 | Slensby | 223—99 |
| 232,185 | 9/1880 | Jaccard | 223—99 |

WILLIAM FELDMAN, *Primary Examiner.*

J. C. PETERS, *Assistant Examiner.*